US009600647B2

(12) United States Patent
Thomas et al.

(10) Patent No.: US 9,600,647 B2
(45) Date of Patent: Mar. 21, 2017

(54) MULTI-FACTOR AUTHENTICATION

(71) Applicant: TATA CONSULTANCY SERVICES LIMITED, Mumbai (IN)

(72) Inventors: Annie Thomas, Bangalore (IN); Shalin Garg, Bangalore (IN); Sneha Bose, Bangalore (IN); Sathish Vallat, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 59 days.

(21) Appl. No.: 14/521,316

(22) Filed: Oct. 22, 2014

(65) Prior Publication Data
US 2015/0143496 A1     May 21, 2015

(30) Foreign Application Priority Data
Nov. 18, 2013   (IN) .......................... 3602/MUM/2013

(51) Int. Cl.
| | |
|---|---|
| *G06F 21/34* | (2013.01) |
| *G06F 21/31* | (2013.01) |
| *G06F 21/32* | (2013.01) |
| *G06F 21/35* | (2013.01) |
| *G06F 21/40* | (2013.01) |
| *G07C 9/00* | (2006.01) |

(52) U.S. Cl.
CPC .............. *G06F 21/34* (2013.01); *G06F 21/31* (2013.01); *G06F 21/32* (2013.01); *G06F 21/35* (2013.01); *G06F 21/40* (2013.01); *G07C 9/00158* (2013.01)

(58) Field of Classification Search
CPC .......... G06F 21/31; G06F 21/32; G06F 21/34; G06F 21/40; G07C 9/00158
See application file for complete search history.

(56) References Cited

U.S. PATENT DOCUMENTS

| | | | | |
|---|---|---|---|---|
| 6,742,713 | B1 * | 6/2004 | Trinkel .............. | G06K 19/0728 235/375 |
| 7,533,735 | B2 * | 5/2009 | Gantman ................ | G06F 21/34 173/182 |
| 8,286,227 | B1 | 10/2012 | Zheng | |

(Continued)

FOREIGN PATENT DOCUMENTS

EP          2575084 A1    4/2012

OTHER PUBLICATIONS

European search opinion for EP 2874088, dated Mar. 12, 2015.*

*Primary Examiner* — Robert Leung
(74) *Attorney, Agent, or Firm* — Seed IP Law Group LLP

(57) ABSTRACT

Methods, systems and devices for multi-factor authentication (MFA) are described. An MFA device includes a plurality of tiles, a frame to hold the tiles and a stylus movable over the frame and the tiles. Each of the tiles includes at least one of visible indicia and tactile indicia, for representing a notation, and at least one track of acoustic code generation indicia. The acoustic code generation indicia of each tile, on being swiped, generate a complex sound waveform that encodes a composite binary pattern. The composite binary pattern comprises information blocks including a device identifier block for a device identifier associating the MFA device with a user, a biometric block for at least a part of a biometric pattern of the user, and a data block for the notation of the corresponding tile.

20 Claims, 6 Drawing Sheets

(56) References Cited

U.S. PATENT DOCUMENTS

| | | | | |
|---|---|---|---|---|
| 2007/0067833 A1* | 3/2007 | Colnot | ............... | H04L 9/3271 |
| | | | | 726/9 |
| 2011/0258121 A1* | 10/2011 | Kauniskangas | ........ | G06Q 20/20 |
| | | | | 705/67 |
| 2014/0331313 A1* | 11/2014 | Kim | ................ | G06F 21/32 |
| | | | | 726/16 |
| 2015/0117158 A1* | 4/2015 | Wu | ................ | G08C 23/02 |
| | | | | 367/197 |

* cited by examiner

MULTI-FACTOR AUTHENTICATION

TECHNICAL FIELD

The present subject matter relates, in general, to user authentication and, in particular, to multi-factor authentication of a user.

BACKGROUND

User authentication is generally used by organizations to restrict access to data, services, or physical locations in order to ensure confidentiality, monitor user activities, and comply with applicable territorial rules and regulations. In one example, a user may be asked to provide authentication credentials by way of a passphrase, biometric information, a token, or the like, before being allowed access to a particular server or computing/network service. In another example, a user may be asked to provide the authentication credentials before being allowed to enter a secure physical area. Despite such authentication measures, instances of identity theft involving unauthorized users hacking into servers or spoofing credentials of authorized users have been increasing.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1A:
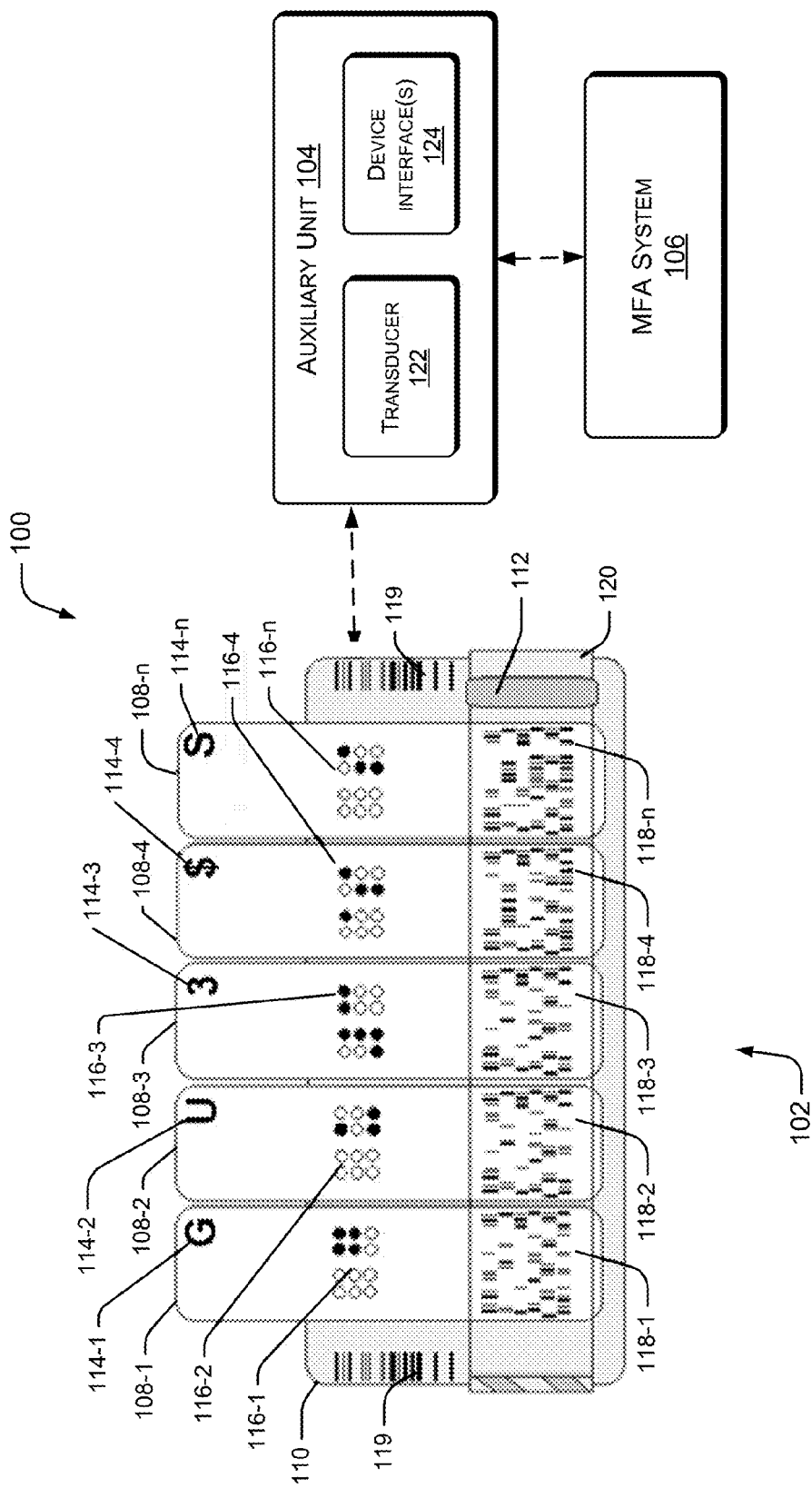
FIG. 1A illustrates a multi-factor authentication (MFA) environment, according to an embodiment of the present subject matter.

Method(s) and system(s) for multi-factor authentication of users are described herein. Users may be authenticated before they are given access to a physical area, a data server, a web service, a web/mobile application or the like. For example, financial service providers, such as banks, employ user authentication before any transaction can be carried out by the user either online or through an Automated Teller Machine (ATM). Similarly, companies employ user authentication to restrict access to company premises and protect confidential information. With increasing security concerns, simple authentication mechanisms, such as using a passphrase, have been found to be inadequate in preventing unauthorized access. As a result, efforts are being made to develop authentication systems that are more robust.

In one example, systems with multiple levels of authentication have been designed, whereby the user has to pass through multiple authentication challenges, such as answering a user specific query or providing a personal identification number (PIN) or a pattern after a passphrase is validated. The multiple authentication level based systems, however, typically rely on a single type of information, such as what the user knows, and hence remain vulnerable to unauthorized access and may also not be compliant with prevalent regulations that require use of multi-factor authentication.

To further strengthen the user authentication process, multi-factor authentication (MFA) systems have been proposed. MFA systems use a combination of different factors or types of credentials for authentication including, for example, knowledge factor that corresponds to information that the user knows, such as a passphrase, a possession factor that corresponds to a physical article that a user has, such as a smart card, a behavioral factor that corresponds to something that a person exhibits while doing an action such as gesture/keystroke/swipe dynamics, and a inherence factor that corresponds to a characteristic of the user, such as biometric information. Typical MFA systems perform the authentication of the different factors based on various models, such as sequential, parallel, weighted, fusion, and the like. For example, an MFA system may first authenticate a smart card followed by authenticating a personal identification number (PIN), thereby entailing multiple actions to be performed by the user and consuming considerable time. Further, such MFA systems are also vulnerable to hacking, for example, by key logging and shoulder surfing, and to information spoofing including biometric spoofing. The conventional MFA systems are also not easy to use for the visually challenged and the elderly since these MFA systems involve the use of display screens and keypad or touch-screen based data entry mechanisms.

In accordance with the present subject matter, devices, systems and methods for multi-factor authentication are described herein. In one embodiment, a multi-factor authentication (MFA) device is described for authenticating a user to whom the multi-factor authentication device is issued. MFA devices may be issued by any organization to its customers and/or employees for use wherever user authentication is required. For example, an organization may issue an MFA device to each of its employees for access control purposes. A bank may issue an MFA device to its customers for user login and authentication before a transaction can be conducted. As will be understood, the MFA device will have to be customized for each user before it is issued to the user and this will be discussed in detail later.

In one implementation, the MFA device of the present subject matter has a plurality of tiles, a frame to hold the tiles, and a stylus movable over the frame and the plurality of tiles. Each of the plurality of tiles includes at least one of visible indicia and tactile indicia for representing a notation. For example, the number 1 may be marked on a tile forming the visible indicia. Alternatively, or in addition, the number may be marked as tactile indicia. Tactile indicia may be understood as a marking corresponding to a tactile code, i.e., a writing system for visually challenged individuals. The tactile codes represent each constituent notation in a specific way to distinguish one notation from another. For instance, in Braille the number and arrangement of the raised dots distinguishes one notation from another. Visually challenged individuals can touch the raised surfaces representing the notation and interpret the notation represented by the corresponding tactile code. Based on the visible and/or tactile indicia, the user can re-arrange the tiles in the frame to form a sequence of notations forming a passphrase.

Further, each of the plurality of tiles also has at least one track of acoustic code generation indicia that can be swiped by the stylus to generate a sound waveform. On being swiped, the acoustic code generation indicia of each of the plurality of tiles generate a corresponding sound waveform that encodes a composite binary pattern to facilitate authentication of the user. The composite binary pattern corresponds to an acoustic code that includes multiple information blocks separated by delimiters. The information blocks in the acoustic code include at least a start block, a device identifier block, a biometric block, a data block, and an end block. The start block corresponds to a start sequence of the acoustic code and the end block corresponds to an end sequence of the acoustic code. The device identifier block corresponds to a device identifier that associates the multi-factor authentication device with the user. The biometric block corresponds to at least a part of a biometric pattern of the user and the data block corresponds to the visible indicia and/or the tactile indicia of the tile.

In operation, when the user arranges the tiles in a particular sequence to form the passphrase and then swipes the acoustic code generation indicia on the tiles using the stylus, a complex sound waveform is generated from the MFA device. The stylus and the acoustic code generation indicia may be designed such that the sound waveforms are generated at predefined frequencies that may be in the audible range, subsonic range, supersonic range, ultrasonic range, or a combination thereof. This complex sound waveform can be converted into an electrical signal using a transducer, for example, by an auxiliary unit, and then processed by an MFA system for determining the passphrase of the user, the device identifier and at least a part of the biometric pattern of the user. The user can be then authenticated based on the passphrase of the user, the device identifier and the biometric pattern. Thus, multi-factor authentication can be performed easily based on information that the user knows, i.e., passphrase, article that the user has, i.e., the MFA device, and inherent characteristic of the user, i.e., biometric pattern. The multi-factor authentication thus performed is secure with little risk of hacking or spoofing. Moreover, the MFA device can also be easily used by the visually challenged and the elderly due to the presence of tactile indicia.

The present subject matter further describes an MFA system and a method for authenticating a user to whom an MFA device is issued. In one implementation, the MFA system can obtain a binary data stream from the electrical signal corresponding to the complex sound waveform generated on the swiping of the acoustic code generation indicia of the MFA device. The binary data stream can be obtained by applying various signal processing techniques, including analog-to-digital conversion, filtering, frequency domain conversion and the like, over the electrical signal. As will be understood, the complex signal encodes the binary data in disparate frequencies associated with each track. Accordingly, the signal is processed multiple times for analog-to-digital conversion means, including quantization, sampling rate and filtering in accordance with the predefined frequency of each track. The MFA system can then generate a reconstructed data stream of data segments from the binary data stream such that each data segment corresponds to an information block. For this, the MFA system can group bits in the binary data stream into the data segments, based on at least the predefined length of the segments and extracting the amplitude peaks at predetermined spacing in the frequency spectrum, corresponding to the presence of binary digit, to form the reconstructed data stream. The data segments thus constituted can then be used for authentication by the MFA system based on a comparison with authentication data.

Authentication data refers to user data that is saved in a data repository at the time of registration of the user and issuance of the MFA device to the user. The authentication data includes a record of the device identifier that associates the MFA device with the user, the passphrase of the user, and the biometric pattern of the user. For the authentication, the MFA system can compare the data segments corresponding to the device identifier block with the device identifier associated with the user in authentication data. Further, the MFA system can gather the data segments corresponding to the data block in the sequence that they were obtained and then compare the gathered data segments with the passphrase of the user stored in the authentication data. In addition, for the biometric authentication, the MFA system can also receive a live biometric pattern from the user and compare the live biometric pattern either with the data segments corresponding to the biometric block or with the biometric pattern stored in the authentication data. It will be understood that the MFA system can be communicatively connected to a biometric reader, such as a fingerprint scanner, a retina scanner, and the like, for receiving the live biometric pattern from the user. In another implementation, the MFA system may receive the live biometric pattern from an auxiliary unit having a biometric reader.

The present subject matter further describes a device customization system and a method for customizing an MFA device for issuance to a user. Device customization as used herein refers to customizing an MFA device for use for authentication of a particular user by encoding user data on the tiles of the MFA device. In one implementation, the device customization system can receive the user data for customizing the MFA device for the user. The user data can include user name, a device identifier of the MFA device to be associated with the user, and at least a part of a biometric pattern of the user. In one implementation, some or all of the user data can be received from the authentication data repository also used by the MFA system described above. Further, the device customization system can determine the number of tiles and the notation to be provided on each of the tiles by way of visible and/or tactile indicia. For example, based on an organization's policy, the device customization system may determine that an MFA device to be issued to an employee would have 10 tiles with 5 tiles having a distinct letter of the alphabet each, say a-e, and 5 tiles having a distinct number between 0-9 marked on them. Similarly, the device customization system may determine that an MFA device to be issued to a customer would have 12 tiles with 4 tiles having a distinct letter of the alphabet each, 4 tiles having a distinct number each, and 4 tiles having a distinct special symbol each. Further, the device customization system can determine whether the notation has to be marked as visible indicia or tactile indicia or both, for example, based on a preference of the user to whom the MFA device is to be issued.

The device customization system can then design acoustic code generation indicia to be marked in each of the plurality of tiles of the MFA device based on the user data such that the sound waveform generated from each acoustic code generation indicia would encode a composite binary pattern corresponding to an acoustic code. As mentioned earlier, for each tile, the acoustic code would include information blocks separated by delimiters. Further, the information blocks for each tile would include a device identifier block corresponding to the device identifier, a data block corresponding to the visible and/or tactile indicia marked on the tile and a biometric block corresponding to a part of the biometric pattern of the user.

In one implementation, the device customization system can determine whether the acoustic code generation indicia of a tile has to be marked in a single track or in multiple tracks on the tile. The device customization system can also determine the number of tracks to be used, for example, based on the length of the acoustic code generation indicia and the space available on the tile. In case multiple tracks are to be used, the acoustic code generation indicia can be designed so that at least one track acts as a reference track to aid in subsequent signal processing by the MFA system.

Further, the device customization system can design a stylus for the MFA device based on the designed acoustic code generation indicia. In one implementation, the number of pins on the stylus corresponds to the number of tracks on which the acoustic code generation indicia is to be marked on a tile. The stylus can be designed such that each of the one or more pins is configured to generate a part of the sound waveform at a corresponding predefined frequency. For example, the length, thickness, orientation of slant of the tip, and profile and shape of a pin tip can be varied so that the sound waveform generated by the pin is of a predefined frequency. It is known in the art, that thick, shorter pins produce strong loud tones and thinner, long pins produce softer tones, thus giving flexibility to vary frequencies for each track. Further, in case the stylus has multiple pins, the predefined frequency for each pin can be different and can be in integral multiples of each other. Accordingly, the stylus to be used with a particular MFA device can be customized thereby providing an extra level of security against misuse of the MFA device since using a different stylus would not produce the sound waveforms at the predefined frequencies and hence the authentication would fail.

Further, in one implementation, the stylus itself can be secured using a combinatorial lock. The combinatorial lock can be configured to release at least one decoy pin when an erroneous combination is selected. The at least one decoy pin would generate at least a part of the sound waveform at an incorrect frequency, thereby leading to authentication failure.

While aspects of described systems and methods can be implemented in any number of different computing systems, environments, and/or configurations, the embodiments are described in the context of the following exemplary system(s).

FIG. 1A illustrates a multi-factor authentication (MFA) environment 100, according to an embodiment of the present subject matter. In one implementation, the MFA environment 100 includes an MFA device 102 for authentication of a user to whom the MFA device 102 has been issued. The MFA device 102 can be communicatively coupled to an auxiliary unit 104, which in turn can communicate with an MFA system 106. It will be understood that, in different implementations, the MFA system 106 may be a stand-alone system or may be a part of a network, such as an enterprise network or a financial services network. Further, in various implementations, the auxiliary unit 104 may be integrated with the MFA device 102 or with the MFA system 106 or may be a part of a separate computing device not shown herein, such as a smart phone or tablet or laptop or the like.

In one implementation, the MFA device 102 has a plurality of tiles 108-1, 108-2, 108-3, 108-4 . . . 108-n, collectively referred to as tiles 108 hereinafter. The MFA device 102 further includes a frame 110 to hold the tiles, and a stylus 112 movable over the frame 110 and the tiles 108 to generate sound waveforms.

As depicted in the figure, each of the tiles 108 can include various indicia, such as visible indicia 114-1, 114-2, 114-3, 114-4, . . . 114-n, referred to individually as visible indicia 114, tactile indicia 116-1, 116-2, 116-3, 116-4, . . . 116-n, referred to individually as tactile indicia 116, and acoustic code generation indicia 118-1, 118-2, 118-3, 118-4, . . . 118-n, referred to individually as acoustic code generation indicia 118.

In one implementation, each of the tiles 108 has at least one of visible indicia 114 and tactile indicia 116 provided on the surface, based on a user preference. The visible indicia 114 and the tactile indicia 116 on a tile represent a notation, such as a numerical digit, a letter of the alphabet, a special symbol or any other character. The tiles 108 are detachable from the frame 110 and hence, can be arranged by the user on the frame 110 to form a passphrase. For example, the tiles 108 of the MFA device 102 are shown in an arrangement that forms a sequence of notations G-U-3-$-S forming the passphrase. In another implementation, the user may form a passphrase 1-2-3-4 using the tiles 108 for authentication. After authentication, the tiles 108 can be removed from the frame 110 and stored by the user, for example, in a separate box or bag, to ensure that the passphrase is not inadvertently disclosed.

In one example, the MFA device 102 may have only the tactile indicia 116 on each of the tiles 108 when the MFA device 102 is issued to a visually challenged person or an elderly person. In another example, the MFA device 102 may have only the visible indicia 114 on each of the tiles 108 when the MFA device 102 is issued to other users. In yet another example, the MFA device 102 may have both the visible indicia 114 and the tactile indicia 116 on each of the tiles 108. In the example MFA device 102 shown in FIG. 1A, the tile 108-1 has both the visible indicia 114-1 and the tactile indicia 116-1, both of which represent the alphabet "G". Similarly, the other tiles 108-2, 108-3, 108-4, 108-n are also shown as having both the visible indicia and the tactile indicia in the example MFA device 102 shown in FIG. 1A.

Further, each of the tiles 108 has acoustic code generation indicia 118 provided in at least one track. A track can be understood as a row of markings. Thus, the MFA device 102 shown in FIG. 1A has the acoustic code generation indicia 118 etched over 6 tracks in each of the tiles 108. However, it will be understood that the acoustic code generation indicia 118 can be provided in one or more tracks on each of the tiles 108. The acoustic code generation indicia 118 of each of the tiles 108, on being swiped by the stylus 112, generate a complex sound waveform that encodes a composite binary pattern to facilitate authentication of the user. In one implementation, the stylus 112 can be fitted over a rail-like frame 120 over which the stylus 112 can slide to swipe the acoustic code generation indicia 118.

The composite binary pattern in a sound waveform generated from a tile 108 corresponds to an acoustic code that includes multiple information blocks separated by delimiters. The information blocks in the acoustic code include at least a start block, a device identifier block, a biometric block, a data block, and an end block. The start block corresponds to a start sequence of the acoustic code and the end block corresponds to an end sequence of the acoustic code. The device identifier block corresponds to a device identifier that maps or associates the MFA device 102 with the user. The device identifier can be, for example, an alphanumeric code that is unique to each MFA device 102 assigned to a user. As a result, the tiles 108 of the MFA device 102 are not interchangeable with tiles of any other MFA device. The biometric block corresponds to at least a part of a biometric pattern of the user and the data block corresponds to the visible indicia 114 and/or the tactile indicia 116 of the tile. In one implementation, the biometric pattern may correspond to at least one of fingerprint pattern, iris pattern, retina pattern, palm vein pattern, finger vein pattern, signature pattern, olfactory pattern, vascular patterns, keystroke pattern, voice signature pattern, face biometric pattern, hand geometry, DNA pattern, earlobe biometric pattern, and heart beat pattern of the user to whom the MFA device 102 is issued.

In other implementations, there may be additional information blocks specific to the application in which the MFA device 102 is to be used. For example, if the MFA device 102 is to be used for authenticating a user for a banking transaction, then the information blocks may also include an account identifier block comprising an account number of the user to whom the MFA device 102 is issued.

In operation, when the user arranges the tiles 108 in a particular sequence to form the passphrase and then swipes the acoustic code generation indicia 118 on the tiles 108 using the stylus 112, a complex sound waveform is generated from the MFA device 102. The stylus 112 and the acoustic code generation indicia 118 may be designed such that the sound waveforms are generated at predefined frequencies for each track that may be in the audible range, subsonic range, supersonic range, ultrasonic range, or a combination thereof.

For capturing the sound waveforms, the MFA device 102 may be communicatively associated with the auxiliary unit 104. For this, the auxiliary unit 104 can include a transducer 122 and a device interface 124. The generated sound waveforms may be captured by the transducer 122, such as a microphone, and a corresponding electrical signal may be provided to the MFA system 106, through the device interface(s) 124, for further processing and analysis. In one example, the device interface(s) 124 may be any interface, for example, a USB interface, a jack, a plug, etc., that can connect the auxiliary unit 104 to the MFA system 106. In another example, the device interface(s) 124 may be a wireless or wired interface that can send the electrical signal to the MFA system 106, for example, over WiFi or Bluetooth or LAN or WAN protocols.

The MFA system 106, on receiving the electrical signal, may process the electrical signal to perform the authentication, as will be discussed in detail later. Further, the MFA system 106 may receive a live biometric pattern from the user for biometric verification. For this, a biometric reader (not shown in this figure) may be coupled to either the auxiliary unit 104 or the MFA system 106, as will be discussed in detail later.

In one implementation, the frame 110 of the MFA device 102 can include at least one supplementary acoustic code generation indicia 119 to generate an ancillary sound waveform that encodes an ancillary composite binary pattern to facilitate a user action. For example, a user may swipe the supplementary acoustic code generation indicia 119 to perform at least one of logging in, locking, unlocking, calling back, resetting, blocking access, initiating cross-channel verification, and navigating through a shortcut to a nested menu on a user interface of the underlying application. Thus, the supplementary acoustic code generation indicia 119 may act as short-cut or direct action inputs. The same stylus 112 which is used for swiping the acoustic code generation indicia 118 may be used for swiping the supplementary acoustic code generation indicia 119. In such a case, in one example, the interpretation of the ancillary sound waveform may not be frequency sensitive, i.e., any pin of the stylus 112 may be used for swiping the supplementary acoustic code generation indicia 119 without generating an error. In other implementations, a different stylus (not shown in this figure) may be used for the supplementary acoustic code generation indicia 119. The manner in which the sound waveforms generated by the supplementary acoustic code generation indicia 119 may be processed by the MFA system 106 would be similar to the manner in which the sound waveforms generated by the acoustic code generation indicia 118 may be processed, as will be explained later.

Figure 1C:
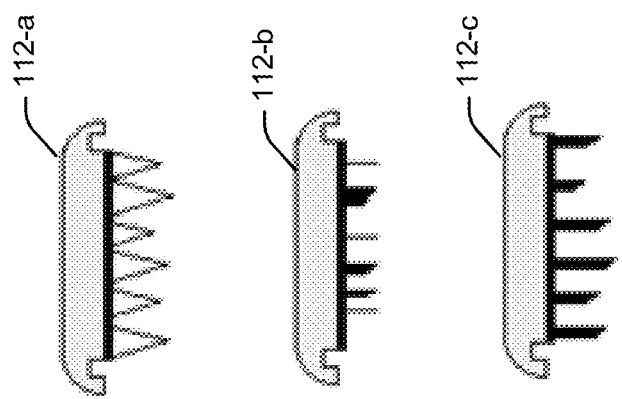
FIG. 1C illustrates different configurations of pins in a stylus, according to different embodiments of the present subject matter.
Figure 1B:
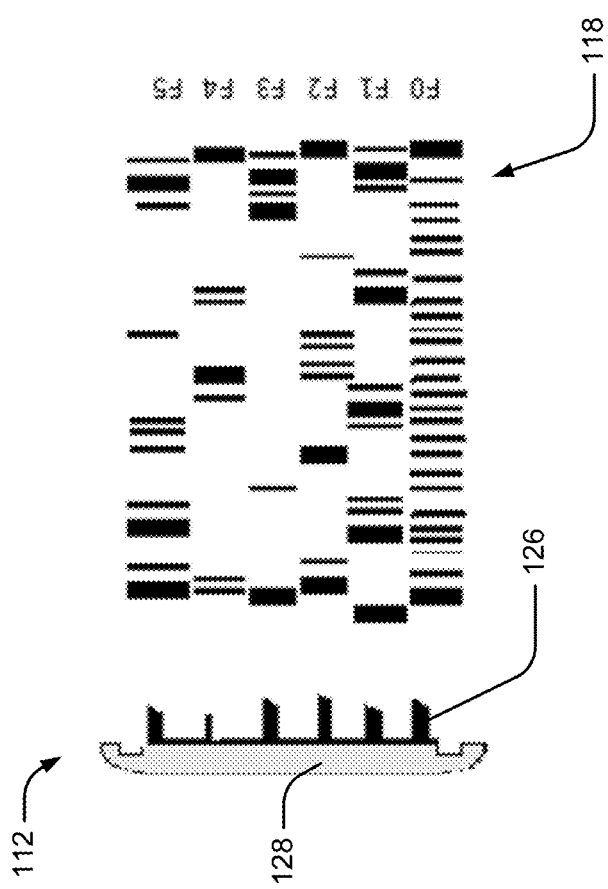
FIG. 1B, illustrates acoustic code generation indicia and a stylus to swipe the acoustic code generation indicia, according to an embodiment of the present subject matter.

FIG. 1B, illustrates the acoustic code generation indicia 118 and a stylus 112 to swipe the acoustic code generation indicia 118, according to an embodiment of the present subject matter. In an example, the markings of acoustic code generation indicia 118 may be provided such that the sound waveform generated includes sound patterns, for example, as pressure variations in the medium with respect to phase, frequency, and amplitude, to encode a composite binary pattern in the sound waveform. The sound waveform is generated when the stylus 112, having pins 126, is swiped over the acoustic code generation indicia 118. In one implementation, the stylus 112 has a holding part 128 to which the pins 126 are coupled, either directly or through a mechanical arrangement. The holding part 128 can be gripped by the user for swiping the stylus 112 over the acoustic code generation indicia 118.

The example acoustic code generation indicia 118 illustrated in the FIG. 1B is marked over 6 tracks, each track having markings corresponding to a predefined frequency that are shown as F0-F5. Further, as can be seen, the number of pins in the stylus 112 is equal to the number of tracks of the acoustic code generation indicia 118. Moreover, each pin 126 in the stylus 112 is configured to produce a sound waveform, at a predefined frequency, when swiped over the corresponding track of the acoustic code generation indicia 118. In one implementation, the frequencies of sound waveforms produced by the pins 126 are in integral multiples of each other.

In one implementation, when the acoustic code generation indicia 118 is provided in multiple tracks, as shown in the figure, one of the tracks, such as track corresponding to frequency F0, acts as a reference track that guides clock timing for reconstruction of the binary pattern of each of the tracks, irrespective of the swipe velocity. The reference track guides the timing and synchronization in picking-up blips corresponding to binary 1 at precision with respect to the markings on the different tracks. This further helps in improving efficiency of the reconstruction and reduces possibility of errors in analog-to-digital conversion process. The other tracks corresponding to frequencies, such as F1-F5, have binary patterns containing actual data, such as the device identifier, biometric pattern, and notation represented as visible/tactile indicia, in the form of binary codes, i.e., zeros and ones.

FIG. 1C illustrates different configurations of pins in the stylus, according to various embodiments. The stylus 112-*a* has pins 126 having triangular or sawtooth profiles, while the stylus 112-*b* and 112-*c* have pins 126 with trapezoidal profiles. The profile shapes may be fine tip or blunt and includes profiles not limited to ellipse, spherical, sawtooth, triangular, square and trapezoidal forms. Further, the pins 126 of stylus 112-*c* are of greater length than the pins 126 of stylus 112-*b*. Thus, the pins 126 can be designed with different shapes, sizes, thickness, slant, orientation, etc., to generate sound waveforms of different predefined frequencies.

Figure 2B:
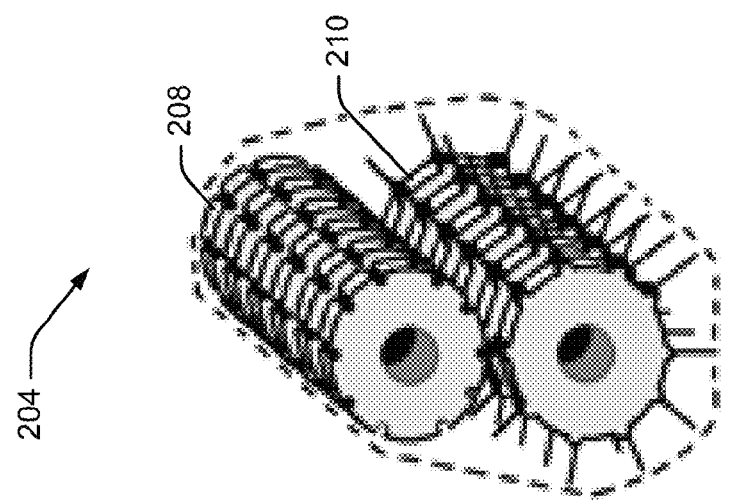
FIGS. 2A and 2B illustrate a stylus with a combinatorial lock and a gear mechanism of the combinatorial lock, according to one embodiment of the present subject matter.
Figure 2A:
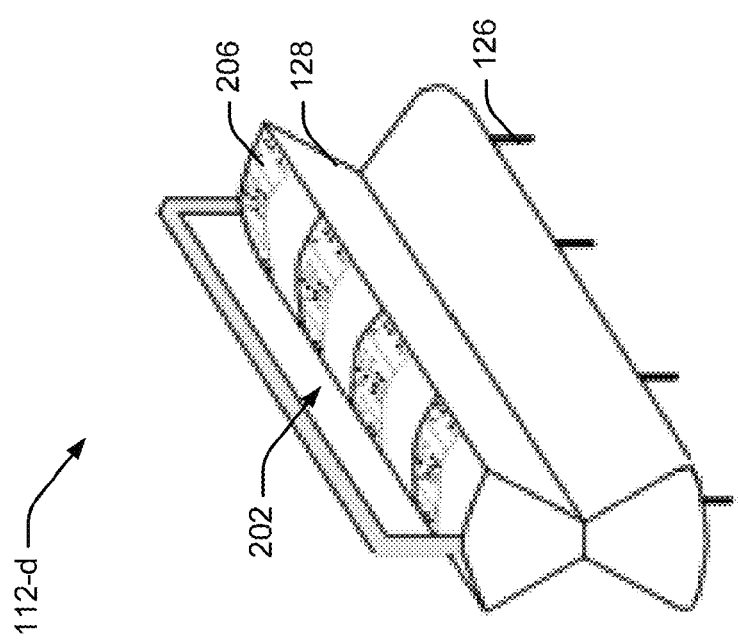

FIGS. 2A and 2B illustrate a stylus with a combinatorial lock as per one embodiment of the present subject matter. The stylus 112-d has a combinatorial lock 202 in the holding part 128. Further, the pins 126 are coupled to the combinatorial lock 202 and the holding part 128 through a gear mechanism 204 (shown in FIG. 2B). To release the correct pins 126, the user has to select the correct combination on the combinatorial lock 202 using digit selectors 206. The digit selectors 206 may have numerical or tactile indicia on them to aid the user in selecting a digit. As will be understood, while the combinatorial lock 202 shown here is of 4 digits, the number of digits and/or characters that can be used in the combinatorial lock 202 can be varied as per the design of the stylus 112. For example, there can be one digit for each of the pins 126. Thus, if a stylus 112 has 6 pins then the combinatorial lock 202 may use a combination of 6 digits.

In one implementation, as shown in FIG. 2B, the gear mechanism 204 has upper gears 208 and lower gears 210. The upper gears 208 are rotatable upon selection of digits or characters on the combination lock 202. For example, as illustrated in the FIG. 2A, there may be 4 digits that can be selected on the combinatorial lock 202 through digit selectors 206. Each of the upper gears 208 is rotatable on rotation of the corresponding digit selector. Further, as each of the upper gears 208 rotates, it causes a corresponding lower gear 210 to rotate. Each of the lower gears 210 have multiple pins extending radially outwards, the pins being of different shapes and sizes and being circumferentially distributed around the lower gear 210. Thus, as each lower gear 210 rotates, it results in the release of a pin, i.e., causes a pin to protrude out from the holding part 128. Further, on each lower gear 210, the pins can be so formed that there is one correct pin, which is configured to generate the sound at the predefined frequency, and multiple decoy pins. The correct pin is released when the correct digit is selected. In case an incorrect digit is selected, a decoy pin, i.e., a pin having a configuration different from the correct pin, is released. If a decoy pin is released and the stylus is used to swipe the acoustic code generation indicia 118, at least a part of the sound wave is produced at a frequency different from the predefined frequency, thereby causing authentication failure. The use of decoy pins thus increases the security level associated with the MFA device 102 since an unauthorized user may not easily determine which one is the correct pin and which ones are the decoy pins for each of the digit selectors 206.

Figure 3:
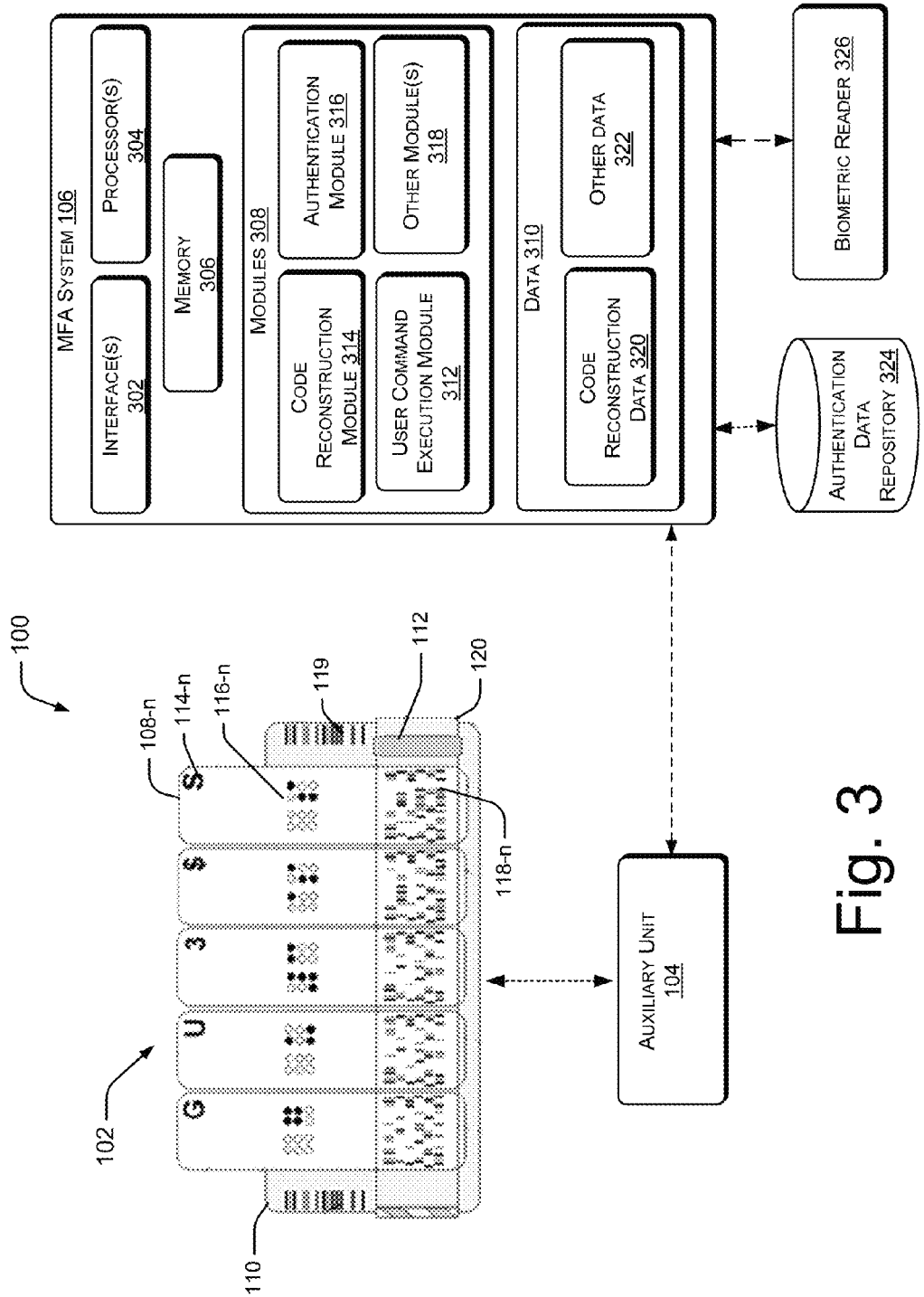
FIG. 3 illustrates an MFA system in detail in an MFA environment, according to one embodiment of the present subject matter.

FIG. 3 illustrates the MFA system 106 in further detail in the MFA environment 100, according to one embodiment of the present subject matter.

In one implementation, the MFA system 106 can be implemented using computing systems that include, but are not limited to, desktop computers, hand-held devices, such as mobile phones and smart phones, multiprocessor systems, personal digital assistants (PDAs), laptops, Automated Teller Machines (ATMs), kiosks, and the like. In an implementation, the MFA system 106 includes interface(s) 302 and one or more processor(s) 304.

The interfaces 302 may include a variety of software and hardware interfaces, for example, interfaces for peripheral device(s), such as a keyboard, a mouse, a microphone, touch pad, and a stylus. Further, the interfaces 302 may enable the MFA system 106, to communicate with other devices, such as servers, computing devices, external databases, and the auxiliary unit 104. The interfaces 302 can facilitate multiple communications within a wide variety of networks, and protocol types, including wired networks, for example, local area network (LAN), cable, etc., and wireless networks such as Wireless LAN (WLAN), cellular, or satellite.

The processor 304 may be implemented as one or more microprocessors, microcomputers, microcontrollers, digital signal processors, central processing units, state machines, logic circuitries, and/or any devices that manipulate signals based on operational instructions. Among other capabilities, the processor 304 is configured to fetch and execute computer-readable instructions stored in a memory.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

In an implementation, the MFA system 106 may include a memory 306. The memory 306 may be communicatively coupled to the processor 304. The memory 306 may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The MFA system 106 further includes module(s) 308 and data 310. The modules 308 and the data 310 may be coupled to the processor 304. The modules 308, amongst other things, include routines, programs, objects, components, data structures, etc., which perform particular tasks or implement particular abstract data types. The modules 308 may also be implemented as, signal processor(s), state machine(s), logic circuitries, and/or any other device or component that manipulate signals based on operational instructions.

The modules 308 can be implemented in hardware, as instructions executed by a processing unit, or by a combination thereof. The processing unit can comprise a computer, a processor, a state machine, a logic array or any other suitable devices capable of processing instructions. The processing unit can be a general-purpose processor which executes instructions to cause the general-purpose processor to perform the required tasks or, the processing unit can be dedicated to perform the required functions.

In another aspect of the present subject matter, the modules 308 may be machine-readable instructions which, when executed by a processor/processing unit, perform any of the described functionalities. The machine-readable instructions may be stored on an electronic memory device, hard disk, optical disk or other machine-readable storage medium or non-transitory medium. In one implementation, the machine-readable instructions can be also be downloaded to the storage medium via a network connection.

The modules 308 include, for example, a user command execution module 312, a code reconstruction module 314, an authentication module 316, and other module(s) 318. The other modules 318 may include programs that supplement applications on the MFA system 106, for example, programs in the operating system. Further, the data 310 serves, amongst other things, as a repository for storing data processed, received, and generated by one or more of the modules 308. The data 310 includes, for example, code reconstruction data 320 and other data 322. The other data 322 may include data generated as a result of the execution of one or more modules in the modules 308.

In one implementation, the code reconstruction module 314 obtains a binary data stream corresponding to the complex sound waveform generated on swiping of the acoustic code generation indicia 118 of the multi-factor authentication device 102. As discussed earlier, the complex sound waveform encodes a composite binary pattern comprising information blocks of an acoustic code to facilitate authentication of the user. The sound waveforms are captured by the auxiliary unit 104 and converted into an electrical signal. In one implementation, the auxiliary unit 104 may process the electrical signal, for example, by analog to digital conversion and other techniques, to provide the binary data stream to the MFA system 106. In another implementation, the auxiliary unit 104 may provide the electrical signal directly to the MFA system 106, where the electrical signal may be converted into the binary data stream. In one example, the binary data stream includes parity bits to ensure integrity of the data from the source.

On obtaining the binary data stream, the code reconstruction module 314 can generate a reconstructed data stream from the binary data stream based on digital signal processing techniques including sampling, quantization, filtering and frequency domain conversion. In one implementation, the code reconstruction module 314 can pass the binary data stream through a series of appropriate filters, such as high pass filters, low pass filters, band stop and band pass filters, depending on the predefined frequencies associated with each track to pick the amplitude or peaks at predefined spacing in the frequency domain. Further, the peaks are obtained by time-stamping and transformation in frequency domain, for example, using Fourier transform or other transformation that can retain the amplitude and phase information of the binary data stream. The data segments are thus extracted by the code reconstruction module 314 based on at least the predefined length of the segments and extracting the amplitude peaks at predetermined spacing in the frequency spectrum, corresponding to the presence of binary digit.

Data segments extracted in this process are then reconstructed with the code reconstruction data 320 and other data 322 and concatenated to form the reconstructed data stream. For this purpose, the code reconstruction data 320 includes information required to extract and reconstruct the data stream, such as length of the different segments, frequency of each track, length of the delimiters, parity indicator. In one implementation, when a part or a particular feature set of a biometric pattern received from a user is to be used for authentication, for example, due to the higher degree of distinctiveness of the particular feature set, the other data 322 can include the feature set of interest to be used for authentication. In one implementation, the other data 322 can also include data to check reverse entry of passphrase, for example, to apply account lock in case of duress or forced coercion attacks. It will be understood that some or all of the code reconstruction data 320 and the other data 322 may be hosted on the MFA system 106 or may retrieved from the authentication data repository 324 during use.

Thus, the code reconstruction module 314 can group bits in the binary data stream into data segments, based at least on the peaks in the frequency domain associated with the bits after applying signal processing techniques mentioned above, to form the reconstructed data stream. Each data segment in the reconstructed data stream corresponds to an information block of the acoustic code. Thus the data segments would include data segments corresponding to the start blocks, end blocks, device identifier blocks, the biometric blocks, the data blocks, and the other information blocks in the acoustic code. Further, the delimiters between the information blocks can help in identifying one information block from another. The reconstructed data stream is then sent to the authentication module 316.

The authentication module 316 can authenticate the user based on a comparison of one or more of the data segments with authentication data corresponding to the user. In one implementation, the MFA system 106 can fetch the authentication data from an authentication data repository 324. The authentication data repository 324 may be communicatively coupled to the MFA system 106, for example, over a network, such as the Internet or an enterprise network or a financial service network or a cloud network. In another implementation, the authentication data repository 324 may be integrated in the MFA system 106 so that the MFA system can work as a stand-alone system without having to be connected to a network. Further, it will be understood that not all authentication data may be stored in a single repository. For example, the device identifier and the passphrase may be stored in one repository, while the biometric data may be stored in another repository. Thus the authentication data repository 324 may be a collection of repositories. It should be noted that biometric template in the authentication data repository 324 may include the entire biometric template or at least a portion of the biometric template containing distinct feature sets of interest.

For the authentication, the authentication module 316 may compare the data segments corresponding to the device identifier block with the device identifier associated with the user in the authentication data. Further, the authentication module 316 can gather the data segments corresponding to the data block in the sequence in which they occurred in the binary data stream. This sequence of data blocks would correspond to the passphrase formed by the user on re-arranging the tiles 108 before swiping the acoustic code generation indicia 118. Accordingly, the authentication module 316 can compare the gathered data segments with a passphrase of the user stored in the authentication data.

Further, the authentication module 316 can receive a live biometric pattern from the user and compare the data segments corresponding to the biometric block with the live biometric pattern to authenticate the user. In another example, the authentication module 316 can compare the live biometric pattern with the biometric pattern of the user stored in the authentication data to authenticate the user. In one implementation, once the authentication module 316 has authenticated the user based on the device identifier and the passphrase, the MFA system 106 may prompt the user to provide the live biometric pattern. In another implementation, the user may provide the live biometric pattern initially irrespective of authentication of the device identifier and the passphrase.

Accordingly, the authentication module 316 may provide an authentication success or failure result based on a biometric authentication decision policy including, for example, number of attempts, a match score obtained, tolerance in comparison, etc. In case the authentication succeeds, the user can be allowed access to the server or physical area or web service for which access was requested.

For receiving the live biometric pattern, the MFA system 106 may be coupled to a biometric reader 326 as shown. However, it will be understood that the biometric reader may be coupled to the auxiliary unit 104 in other implementations and the auxiliary unit 104 may receive the live biometric pattern and provide the same to the MFA system 106 for user authentication.

In one implementation, the code reconstruction module 314 of the MFA system 106 can obtain an ancillary binary data stream corresponding to supplementary acoustic code generation indicia 119 present on the frame 110 of the MFA device 102, and can generate an ancillary reconstructed data stream in the same manner as described above for generation of the reconstructed data stream. Further, based on the ancillary reconstructed data stream, the user command execution module 312 may perform a user action, for example, logging in, locking, unlocking, calling back, resetting, blocking access, initiating cross-channel verification, and navigating through a shortcut to a nested menu on a user interface of the underlying application.

Thus, the MFA device 102 can be used for authenticating the user in a convenient and secure manner. Moreover, visually challenged people can also easily use the MFA device 102 for online authentication, whereas conventionally they had to rely on assistance from others to enter the login credentials. The tactile interface on the MFA device 102 and the stylus 112 aids them to be self-reliant, and the usability is further extended in use by the user command module 312 and the supplementary acoustic code generation indicia 119. Further, authentication using the MFA device 102 can be used for online authentication in lieu of login id and passwords making it secure against hacking and spoofing. For example, as mentioned above, the auxiliary unit 104 may be a computing device, such as a laptop, mobile phone, etc., that can capture the sound waveforms and provide the binary data stream to a network connected MFA system 106 for authentication. The auxiliary unit 104 in this case may have the biometric reader 326 integrated with it or connected to it. The MFA device 102 can also be used for access control of a restricted area in place of smart cards that are conventionally used. In such a case, the MFA system 106 may be an access control panel with the auxiliary unit 104 and the biometric reader integrated in it. A user desirous of entering into the restricted area may swipe the tiles in the MFA device 102 after forming the passphrase and, on authentication, may be allowed to enter the restricted area. In another example, the MFA device 102 may be used for one time password (OTP) authentication. In this case, an organization, such as a bank or other financial organization, may issue labels or stickers with OTPs and the user can re-arrange the tiles to form the OTP and can swipe the tiles to provide the OTP for authentication. Other uses and configurations of the MFA device 102, auxiliary unit 104 and the MFA system 106, though not described herein, will be evident to a person skilled in the art based on the description provided herein and are covered in the scope of the present subject matter.

Figure 4:
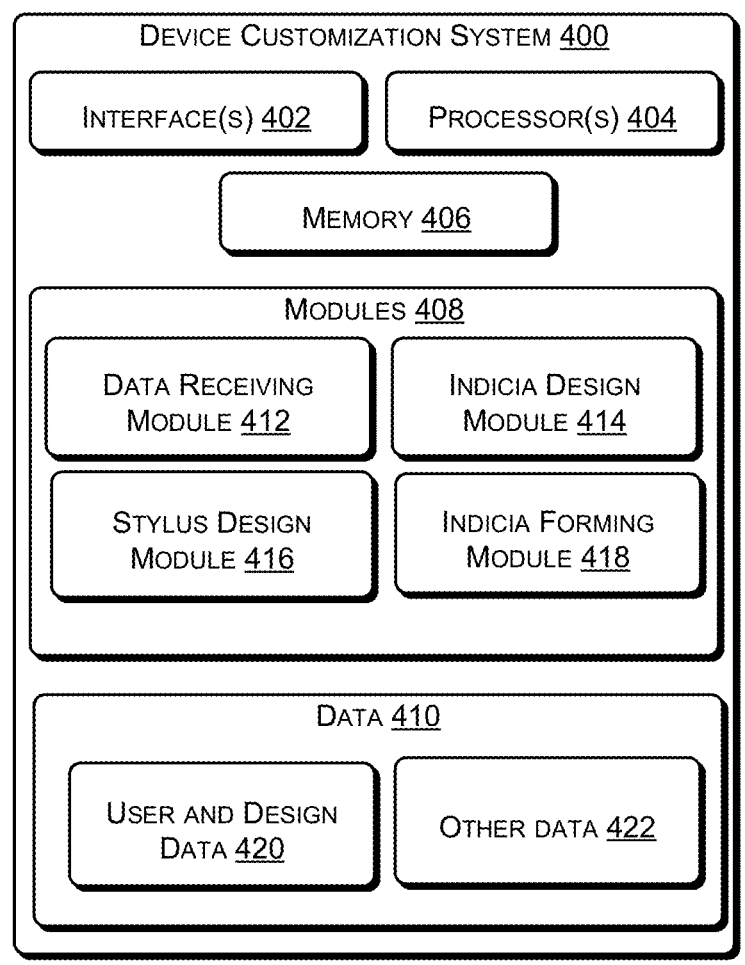
FIG. 4 illustrates a device customization system, according to one embodiment of the present subject matter.

FIG. 4 illustrates a device customization system 400, according to one embodiment of the present subject matter. In one implementation, the device customization system 400 can be implemented using computing systems that include, but are not limited to, desktop computers, multiprocessor systems, personal digital assistants (PDAs), laptops, and the like. In an implementation, the device customization system 400 includes interface(s) 402 and one or more processor(s) 404.

The interfaces 402, like the interfaces 302, may include a variety of software and hardware interfaces to enable the device customization system 400 to communicate with other devices, such as web servers, other computing devices, external databases, within a wide variety of networks and protocol types. The processor 404, like the processor 304, may be implemented in various ways known in the art, for example, through the use of dedicated hardware as well as hardware capable of executing software in association with appropriate software, to fetch and execute computer-readable instructions stored in a memory. Further, the device customization system 400 may include a memory 406, similar to the memory 306. The memory 406 may be communicatively coupled to the processor 404 and may include any non-transitory computer-readable medium known in the art.

The device customization system 400 further includes module(s) 408 and data 410. The modules 408 and the data 410 may be coupled to the processor 404. The modules 408, amongst other things, include routines, programs, objects, components, data structures, etc., which perform particular tasks or implement particular abstract data types. The modules 408 may also be implemented as, signal processor(s), state machine(s), logic circuitries, and/or any other device or component that manipulate signals based on operational instructions. The modules 408 can be implemented in hardware, instructions executed by a processing unit, or by a combination thereof. In another aspect of the present subject matter, the modules 408 may be machine-readable instructions which, when executed by a processor/processing unit, perform any of the described functionalities.

The modules 408 include, for example, a data receiving module 412, an indicia design module 414, a stylus design module 416, and an indicia forming module 418. The modules 408 may also include other module(s), not shown in the figure, but including programs that supplement applications on the device customization system 400, for example, programs in the operating system. Further, the data 410 serves, amongst other things, as a repository for storing data processed, received, and generated by one or more of the modules 408. The data 410 includes, for example, user and design data 420 and other data 422. The other data 422 may include data generated as a result of the execution of one or more modules in the modules 408.

In one implementation, the data receiving module 412 can receive user data for customizing and producing a multi-factor authentication device, such as the MFA device 102. The user data can include, for example, user name, an account identifier, a device identifier for the multi-factor authentication device to be associated with the user, the designated character-set and notations chosen by the user for the passphrase during enrolment and at least one biometric pattern of the user captured during user biometric enrolment. The user data may be received from the user and design data 420. The user data may also be received from an external memory device or a network connected computing device or an input device, and stored in the user and design data 420. In one implementation, the data receiving module 412 may verify whether the user data received meets the data requirements that may be provided based on a policy set by an organization issuing the multi-factor authentication device. For example, the data requirements may specify that the device identifier be unique, between 12-18 characters in length and alphanumeric, or the user name include a first name and a last name, or the biometric pattern that surpasses the threshold score for biometric verification during enrolment, and the like. In case the user data does not meet the data requirements, the device data receiving module 412 may prompt an operator of the device customization system 400 to correct the user data.

Further, the user data along with design data can be used by the indicia design module 414 to design acoustic code generation indicia in one or more tracks for each of a plurality of tiles of the multi-factor authentication device. The design data can include, for example, the number of tiles to be made, the even or odd parity indicator for the data stream, the types of indicia to be marked on the tiles, the notations to be marked on the tiles, the number of tracks that can be marked, and guidelines for creating the acoustic code generation indicia on each tile so as to produce sound waveforms encoding a composite binary pattern. The factors for creating the acoustic code generation indicia can include, for example, criteria for determining number of markings in the acoustic code generation indicia, thickness and depth of each marking, and spacing between each of the markings. In one implementation, the different tracks in the acoustic code generation indicia of one tile are designed so as to produce a cohesive sound waveform from a single swipe of the acoustic code generation indicia. For this, the frequencies generated from the different tracks can be designed to be in integral multiples, for example, by varying the thickness or depth of etching or embossing and distance between the markings, along with appropriate design of the pins to be used for swiping. The tiles can be in the form of stickers or directly marked on the surface like glass, acrylic, plastic, etc.

In one implementation, the entire operation can work in an automated fashion wherein the unmarked tiles are fed into the input tray of the system and the corresponding computer implemented method in the device customization system feeds the binary data stream to be marked on the tile in a series of rows forming the tracks, as determined by the length of the data stream and the spacing between consecutive bits as per each track. Thus, the composite data stream forming the MFA credential is split into multiple rows with spacing between consecutive bits defined in accordance to the sound wave frequency principles that frequency is inversely proportional to time period. The frequency of the track is in accordance to the distance between the etchings of consecutive bits. It should be noted that since each track has different frequencies, the spacings between the marking is unique for a track and can be different in different tracks. There may be sensors to check the presence of tile as and when the tiles are fed for marking or etching. There is also a feed from the user and design data 420 on the designated character-set and notations chosen by the user for the passphrase. The indicia design module 414 provides the typographics and design as per the tactile writing system for the mentioned notations. In certain cases, at least one of tactile/visible indicia is marked/printed on the tile by the indicia forming module 418. There can be a provision to include the logo and the branding of the organization on the tiles. A series identifier for the batch of tiles printed on any day can also be marked. At the outlet tray of the customization system 400 is the collection tray of the marked tiles with the MFA credentials.

The indicia design module 414 can similarly design the supplementary acoustic code generation indicia based on the user and design data 420. The designed acoustic code generation indicia and supplementary acoustic code generation indicia may be referred to as indicia design information.

Further, based on the designed acoustic code generation indicia and the user and design data 420, the stylus design module 416 can design a stylus having one or more pins. As mentioned earlier, the number of pins in the stylus can be equal to the number of tracks in the designed acoustic code generation indicia, and each of the pins can be configured to generate a part of the acoustic code at a corresponding predefined frequency. For this, the stylus design module 416 can determine the length, thickness, slant, orientation, and profile shape of each of the pins based on design criteria stored in the user and design data 420. The designed stylus may be referred to as stylus design information.

The indicia design information and the stylus design information thus obtained can be provided for customizing the multi-factor authentication device. For customizing the MFA device, in one implementation, a separate mechanical set-up may be used and the controller, such as a processing unit, of the mechanical set-up can be provided the indicia design information and the stylus design information for customization of the tiles, frame and stylus. In another implementation, the indicia forming module 418 can control the mechanical set-up. The indicia forming module 418 may, for example, control marking of the acoustic code generation indicia and the corresponding at least one of visible indicia and tactile indicia on each of the tiles. Further, the indicia forming module 418 may control marking of the supplementary acoustic code generation indicia on the frame of the multi-factor authentication device in a similar manner. It will be understood that the indicia may be marked on the tiles or the frame by etching or embossing or any other known method. Thus, the multi-factor authentication characteristics or credentials, such as passphrase, device identifier, account identifier, and biometric information, which are conventionally available in digital form, can be effectively encoded into a tangible form on the MFA device 102.

Figure 5:
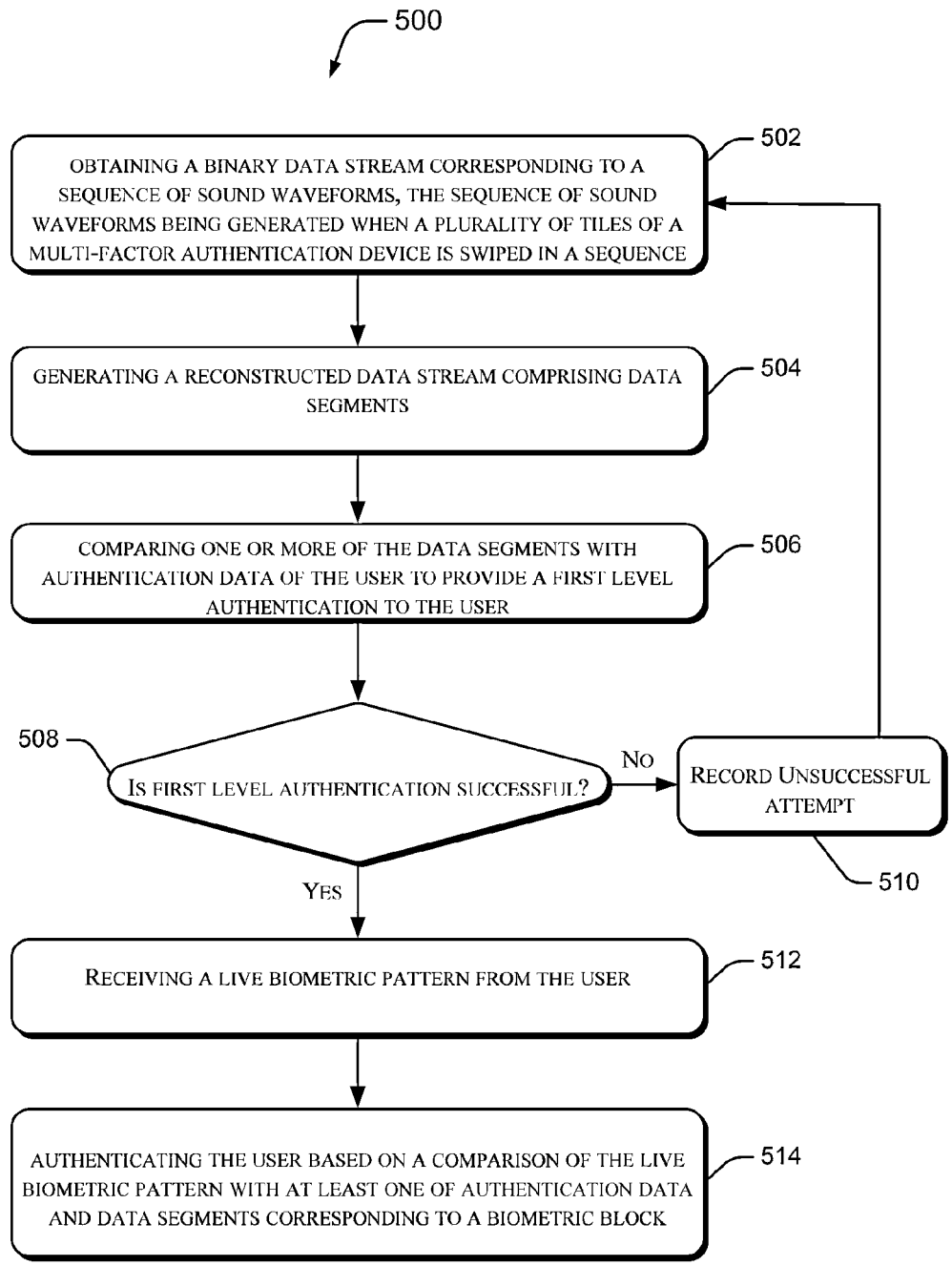
FIG. 5 illustrates a method for multi-factor authentication, according to one embodiment of the present subject matter.

FIG. 5 illustrates a method 500 for multi-factor authentication, according to one embodiment of the present subject matter. In an example, the method 500 may be performed by a computing system, say, the MFA system 106, to authenticate a user.

The method 500 may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

The order in which the method 500 is described is not intended to be construed as a limitation, and any number of the described method steps can be combined in any order to implement the method, or an alternative method. Additionally, individual steps may be deleted from the method without departing from the spirit and scope of the subject matter described herein. Furthermore, the method can be implemented in any suitable hardware, software, firmware, or combination thereof.

At step 502, binary data stream corresponding to a sequence of sound waveforms is obtained, the complex sound waveform being generated when a plurality of tiles of a multi-factor authentication device is swiped in a sequence. Each sound waveform encodes a composite binary pattern containing information blocks including at least a device identifier block corresponding to a device identifier that associates a multi-factor authentication device uniquely with a user, a biometric block corresponding to a biometric pattern of the user, a data block corresponding to at least one of visible indicia and tactile indicia. In one implementation, the binary data stream is obtained by a code reconstruction module 314 of a multi-factor authentication (MFA) system 106.

At step 504, a reconstructed data stream is generated from the binary data stream. The reconstructed data stream includes data segments formed by grouping bits in the binary data stream after application of signal processing techniques, such as filtering and frequency domain conversion. Each of the data segments in the reconstructed data stream corresponds to an information block in the composite binary pattern. In one implementation, the reconstructed data stream is generated by the code reconstruction module 314 of the MFA system 106.

At step 506, one or more of the data segments are compared with authentication data of the user to authenticate the user. For example, the data segments corresponding to the device identifier block may be compared with a device identifier present in authentication data. Similarly, the data segments corresponding to data blocks may be gathered in the sequence of their occurrence in the reconstructed data stream and compared with a passphrase of the user present in the authentication data. In one example, the authentication module 316 authenticates the user based on a comparison of one or more of the data segments with the authentication data.

At step 508, it is determined whether the passphrase, device identifier and stylus based first-level authentication was successful. In case the first-level authentication was not successful, the method 500 proceeds to step 510, where the user is alerted of a failed login attempt and the failed login attempt is recorded in the MFA system 106. The user is then prompted to re-enter the passphrase and the method re-starts at step 502. In one implementation, if the number of failed login attempts reached a predefined value then the user account gets locked for a predefined time period or until an administrator of the MFA system 106 unlocks the user account.

On the other hand, on successful first-level authentication of the user based on the device identifier and the passphrase, the method 500 proceeds from step 508 to step 512 where a live biometric data or pattern may be obtained from the user. For example, a prompt may be provided to the user asking the user to provide the live biometric pattern through a biometric reader. The live biometric pattern may correspond to at least one of fingerprint pattern, iris pattern, retina pattern, palm vein pattern, finger vein pattern, signature pattern, olfactory pattern, vascular patterns, keystroke pattern, voice signature pattern, face biometric pattern, hand geometry, DNA pattern, earlobe biometric pattern, and heart beat pattern. In one implementation, the authentication module 316 may obtain the live biometric pattern from the user.

At step 514, the live biometric pattern may be compared with at least a portion of one of biometric pattern in the authentication data and biometric pattern obtained from the reconstructed data stream to further authenticate the user. In one implementation, the authentication module 316 may perform the comparison to authenticate the user.

Although embodiments for the described systems and methods have been described in language specific to structural features and/or methods, it is to be understood that the invention is not necessarily limited to the specific features or methods described. Rather, the specific features and methods are disclosed as exemplary embodiments for the described systems and methods.

We claim:

1. A multi-factor authentication device for authenticating a user to whom the multi-factor authentication device is issued, the multi-factor authentication device comprising:
   a plurality of tiles, each of the plurality of tiles including:
      at least one of visible indicia and tactile indicia for representing a notation; and
      at least one track of acoustic code generation indicia;
   a frame to hold the tiles; and
   a stylus movable over the frame and the plurality of tiles to swipe the acoustic code generation indicia of each of the plurality of tiles;
   wherein, on being swiped, the acoustic code generation indicia of each of the plurality of tiles generate a corresponding sound waveform that encodes a composite binary pattern to facilitate authentication of the user, wherein the composite binary pattern comprises information blocks forming an acoustic code, the information blocks comprising:
      a device identifier block corresponding to a device identifier that associates the multi-factor authentication device with the user;
      a biometric block corresponding to at least a part of a biometric pattern of the user; and
      a data block corresponding to the at least one of the visible indicia and the tactile indicia of the corresponding tile.

2. The multi-factor authentication device as claimed in claim 1, wherein the information blocks further comprise a start block corresponding to a start sequence of the acoustic code, an end block corresponding to an end sequence of the acoustic code, and an account identifier block corresponding to an account id of the user, and wherein each of the information blocks are separated by delimiters.

3. The multi-factor authentication device as claimed in claim 1, wherein the stylus comprises at least one pin to swipe the acoustic code generation indicia, and wherein the at least one pin is adapted to generate the sound waveform at a predefined frequency selected from an audible frequency, an ultrasonic frequency, a subsonic frequency, and a supersonic frequency.

4. The multi-factor authentication device as claimed in claim 3, wherein the stylus further comprises a combinatorial lock configured to release at least one decoy pin when an erroneous combination is selected, and wherein the at least one decoy pin is adapted to generate at least a part of the sound waveform at an incorrect frequency.

5. The multi-factor authentication device as claimed in claim 1, wherein each of the plurality of tiles includes the acoustic code generation indicia in multiple tracks, and wherein the multiple tracks comprise a reference track for reconstructing the composite binary pattern.

6. The multi-factor authentication device as claimed in claim 5, wherein the stylus comprises multiple pins, a pin corresponding to each of the multiple tracks, and wherein each of the multiple pins is configured to generate a part of the sound waveform at a corresponding predefined frequency.

7. The multi-factor authentication device as claimed in claim 1 further comprising an auxiliary unit including one or more of:
   a device interface to couple the multi-factor authentication device to an MFA authentication system; and
   a transducer to capture and convert the sound waveform into an electrical signal.

8. The multi-factor authentication device as claimed in claim 7, wherein the auxiliary unit is coupled to a biometric reader to read a live biometric pattern from the user.

9. The multi-factor authentication device as claimed in claim 8, wherein the live biometric pattern corresponds to at least one of fingerprint pattern, iris pattern, retina pattern, palm vein pattern, finger vein pattern, signature pattern, olfactory pattern, vascular patterns, keystroke pattern, voice signature pattern, face biometric pattern, hand geometry, DNA pattern, earlobe biometric pattern, and heart beat pattern.

10. The multi-factor authentication device as claimed in claim 1, wherein the frame includes at least one supplementary acoustic code generation indicia to generate an ancillary sound waveform that encodes an ancillary composite binary pattern to facilitate performance of a user action.

11. The multi-factor authentication device as claimed in claim 10, wherein the user action corresponds to at least one of logging in, locking, unlocking, calling back, resetting, blocking access, initiating cross-channel verification, and navigating through a shortcut to a nested menu on a user interface of the underlying application.

12. A computer implemented multi-factor authentication system for authenticating a user to whom a multi-factor authentication device is issued, the multi-factor authentication system comprising:
  a hardware processor;
  a communications interface to connect the multi-factor authentication system to an auxiliary unit to receive electrical signals from the multi-factor authentication device;
  a code reconstruction module, coupled to the hardware processor, to
    obtain a binary data stream from the electrical signals corresponding to a complex sound waveform generated on swiping the acoustic code generation indicia of the multi-factor authentication device, wherein the corresponding sound waveform encodes a composite binary pattern to facilitate authentication of the user, wherein the composite binary pattern comprises information blocks forming an acoustic code, the information blocks comprising:
      a device identifier block corresponding to a device identifier that associates the multi-factor authentication device with the user;
      a biometric block corresponding to at least a part of a biometric pattern of the user; and
      a data block corresponding to at least one of visible indicia and tactile indicia and forming a part of a passphrase; and
    generate a reconstructed data stream of data segments from the binary data stream, wherein each data segment corresponds to an information block; and
  an authentication module, coupled to the hardware processor, to authenticate the user based on a comparison of one or more of the data segments with authentication data corresponding to the user.

13. The computer implemented multi-factor authentication system as claimed in claim 12, wherein the code reconstruction module is configured to group bits in the binary data stream into the data segments based on length of the data segments and extracting peaks at predetermined spacing in the frequency spectrum, corresponding to presence of binary digit, to form the reconstructed data stream.

14. The computer implemented multi-factor authentication system as claimed in claim 12, wherein the authentication module performs the comparison by:
  comparing the data segments corresponding to the device identifier block with the device identifier associated with the user in the authentication data;
  comparing the data segments corresponding to the account identifier block with the account identifier associated with the user account in the authentication data;
  gathering the data segments corresponding to the data block in the sequence of the swiped acoustic code generation indicia; and
  comparing the gathered data segments with a passphrase of the user stored in the authentication data.

15. The computer implemented multi-factor authentication system as claimed in claim 14, wherein the authentication module receives a live biometric pattern and compares data segments corresponding to the biometric block with the live biometric pattern to authenticate the user.

16. The computer implemented multi-factor authentication system as claimed in claim 12, wherein the authentication module receives a live biometric pattern and compares the live biometric pattern with the biometric pattern of the user stored in an authentication data repository to authenticate the user.

17. The computer implemented multi-factor authentication system as claimed in claim 12, further comprising a biometric reader coupled to the hardware processor to receive a live biometric pattern.

18. A computer implemented device customization system for customizing a multi-factor authentication device for issue to a user, the device customization system comprising:
  a hardware processor;
  a data receiving module, coupled to the hardware processor, to receive user data for customizing the multi-factor authentication device, wherein the user data includes user name, a device identifier for the multi-factor authentication device to be associated with the user and at least one biometric pattern of the user;
  an indicia design module, coupled to the hardware processor, to design acoustic code generation indicia in one or more tracks for each of a plurality of tiles of the multi-factor authentication device based on user and design data, such that the acoustic code generation indicia generates an acoustic code that encodes information blocks to facilitate authentication of the user, the information blocks comprising:
    a device identifier block corresponding to a device identifier that associates the multi-factor authentication device with the user;
    a biometric block corresponding to a biometric pattern of the user; and
    a data block corresponding to at least one of visible indicia and tactile indicia; and
  a stylus design module, coupled to the hardware processor, to design a stylus having one or more pins based on the user and design data, each of the one or more pins corresponding to one track of the acoustic code generation indicia, wherein each of the one or more pins are configured to generate a part of the acoustic code at a corresponding predefined frequency.

19. The computer implemented device customization system as claimed in claim 18, further comprising an indicia forming module to control marking of the acoustic code generation indicia and the corresponding at least one of visible indicia and tactile indicia on each of the plurality of tiles based on the designed acoustic code generation indicia.

20. The computer implemented device customization system as claimed in claim 18, wherein the indicia design module further designs at least one supplementary acoustic code generation indicia for placement on a frame configured to hold the plurality of tiles.

\* \* \* \* \*